(12) United States Patent
Kluzner et al.

(10) Patent No.: US 11,125,176 B2
(45) Date of Patent: Sep. 21, 2021

(54) METHODS AND SYSTEM FOR DETERMINING ENGINE AIR-FUEL RATIO IMBALANCE

(71) Applicant: Ford Global Technologies, LLC, Dearborn, MI (US)

(72) Inventors: Michael Kluzner, West Bloomfield, MI (US); Robert Jentz, Westland, MI (US); Kenneth John Behr, Farmington Hills, MI (US); Christopher Weber, Plymouth, MI (US); Andrew Bagnasco, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/218,399

(22) Filed: Dec. 12, 2018

(65) Prior Publication Data

US 2020/0191082 A1 Jun. 18, 2020

(51) Int. Cl.
*F02D 41/14* (2006.01)

(52) U.S. Cl.
CPC ..... *F02D 41/1454* (2013.01); *F02D 41/1441* (2013.01); *F02D 41/1475* (2013.01); *F01N 2560/025* (2013.01); *F02D 2200/0614* (2013.01)

(58) Field of Classification Search
CPC ............ F02D 41/1454; F02D 41/1441; F02D 41/1475; F02D 2200/0614; F01N 2560/025
See application file for complete search history.

(56) References Cited

U.S. PATENT DOCUMENTS

| | | | | |
|---|---|---|---|---|
| 4,628,884 A | * | 12/1986 | Geering | F02D 41/2458 123/684 |
| 4,825,837 A | * | 5/1989 | Nakagawa | F02D 41/1476 123/681 |
| 4,903,668 A | * | 2/1990 | Ohata | F02D 41/047 123/478 |
| 4,913,122 A | * | 4/1990 | Uchida | F02D 41/2445 123/674 |
| 4,987,890 A | * | 1/1991 | Nagaishi | F02D 41/047 123/480 |
| 5,363,648 A | * | 11/1994 | Akazaki | F02D 41/008 123/703 |
| 5,524,598 A | * | 6/1996 | Hasegawa | F02D 41/1401 123/672 |
| 5,558,075 A | * | 9/1996 | Maki | F02D 41/1402 123/680 |
| 5,558,076 A | * | 9/1996 | Maki | F02D 41/0002 123/687 |
| 5,606,959 A | * | 3/1997 | Maki | F02D 41/008 123/673 |
| 5,619,976 A | * | 4/1997 | Kitagawa | F02D 41/1402 123/679 |

(Continued)

*Primary Examiner* — Hung Q Nguyen
*Assistant Examiner* — Susan E Scharpf
(74) *Attorney, Agent, or Firm* — Geoffrey Brumbaugh; McCoy Russell LLP

(57) ABSTRACT

Systems and methods for operating an engine that includes an oxygen sensor and one or more fuel injectors for each engine cylinder are described. In one example, lines describing a relationship between a fuel mass multiplier and a coefficient of a function describing output of an oxygen sensor to a step change in fuel mass are a basis for determining air-fuel imbalance of engine cylinders.

19 Claims, 6 Drawing Sheets

(56) References Cited

U.S. PATENT DOCUMENTS

| | | | | |
|---|---|---|---|---|
| 5,623,913 A * | 4/1997 | Kitajima | ............... | F02D 41/008 123/673 |
| 5,632,261 A * | 5/1997 | Maki | ................... | F02D 41/1402 123/674 |
| 5,636,621 A * | 6/1997 | Maki | ................... | F02D 41/1402 123/480 |
| 5,638,802 A * | 6/1997 | Maki | ..................... | F02D 41/126 123/675 |
| 5,648,601 A * | 7/1997 | Katoh | ................... | G01N 33/007 73/1.06 |
| 5,649,518 A * | 7/1997 | Maki | ..................... | F02D 41/126 123/682 |
| 5,657,735 A * | 8/1997 | Maki | ..................... | F02D 41/008 123/673 |
| 5,720,265 A * | 2/1998 | Maki | ................... | F02D 13/0215 123/680 |
| 5,755,094 A * | 5/1998 | Maki | ..................... | F02D 41/008 60/276 |
| 5,880,952 A * | 3/1999 | Yasui | ................. | G05B 13/0255 700/28 |
| 5,908,463 A * | 6/1999 | Akazaki | ................ | F02D 41/008 123/480 |
| 6,073,073 A * | 6/2000 | Kitamura | ............ | F02D 41/1402 123/698 |
| 6,161,530 A * | 12/2000 | Kakizaki | ............ | F02D 41/0042 123/674 |
| 6,314,952 B1 * | 11/2001 | Turin | ................... | F02D 41/0085 123/673 |
| 6,760,657 B2 * | 7/2004 | Katoh | ................. | F02D 41/1403 123/429 |
| 9,683,506 B2 * | 6/2017 | Jammoussi | ......... | F02D 41/1495 |
| 2011/0073085 A1 * | 3/2011 | Rajagopalan | ............. | F01N 9/00 123/672 |
| 2011/0073087 A1 * | 3/2011 | Meyer | ................. | F02D 41/1401 123/703 |
| 2016/0258375 A1 * | 9/2016 | Jammoussi | ........... | F02D 41/123 |
| 2016/0258376 A1 * | 9/2016 | Jammoussi | ........... | F02D 41/123 |

* cited by examiner ic machine) includes pinion shaft 98 and pinion

METHODS AND SYSTEM FOR DETERMINING ENGINE AIR-FUEL RATIO IMBALANCE

FIELD

The present description relates to methods and a system for determining and compensating for engine cylinder air-fuel ratio imbalance.

BACKGROUND AND SUMMARY

An internal combustion engine may include a plurality of cylinders in which combustion occurs. Each of the plurality of cylinders may receive fuel from a dedicated fuel injector. Further, each of the plurality of cylinders may receive air from a dedicated air intake passage. Manufacturing variation, wear, and dimensional differences of intake passages for the engine's cylinders may lead to air-fuel imbalances in the cylinders. The air-fuel imbalances within the cylinders may cause variation of exhaust gases that exit the engine cylinders and enter a catalyst in the engine's exhaust system. The variation of exhaust gases entering the catalyst may reduce catalyst efficiency and increase exhaust emissions. However, it may be difficult to determine individual cylinder air-fuel ratio imbalances for an engine that includes a plurality of cylinders and only one pre-catalyst oxygen sensor for a bank of cylinders because the single oxygen sensor may be exposed to exhaust gases from all cylinders of a cylinder bank. Therefore, it may be desirable to provide a way of determining air-fuel imbalances of individual cylinders via a single oxygen sensor even in exhaust systems where the oxygen sensor may be exposed to exhaust gases of all cylinders of a cylinder bank.

The inventors herein have recognized the above-mentioned issues and have developed an engine operating method, comprising: adjusting an amount of fuel supplied to a cylinder via a controller according to a cylinder lambda deviation generated via a line describing a relationship between a fuel mass multiplier and a coefficient of a function describing output of an oxygen sensor to a step change in fuel mass.

By adjusting a fuel mass according to a cylinder lambda deviation generated via a line describing a relationship between a fuel mass multiplier and a coefficient of a function describing output of an oxygen sensor to a step change in fuel mass, it may be possible to reduce cylinder air-fuel ratio imbalance so engine cylinders may operate more uniformly. Consequently, control of engine air-fuel ratio and emissions may be improved. Specifically, the inventors have discovered that the coefficient of a function may provide insight into an amount of air and fuel that is inducted into an engine cylinder even when oxygen sensor output exhibits noise that may be due to oxygen sensor degradation or other changes in the engine system. The coefficient may be applied to determine an equation of a straight line that intersects with an axis of a two dimensional plot. The point at which the straight line intersects with one of the axes represents a lambda, or alternatively an air-fuel, imbalance for a cylinder. The amount of fuel injected into the cylinder may be adjusted according to the lambda or air-fuel imbalance so that the cylinder operates at a desired air-fuel ratio instead of with an unknown air-fuel ratio bias.

The present description may provide several advantages. In particular, the approach may improve cylinder air-fuel ratio control. Further, the approach may implemented without increasing system hardware cost. Further still, the approach may help to reduce engine emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
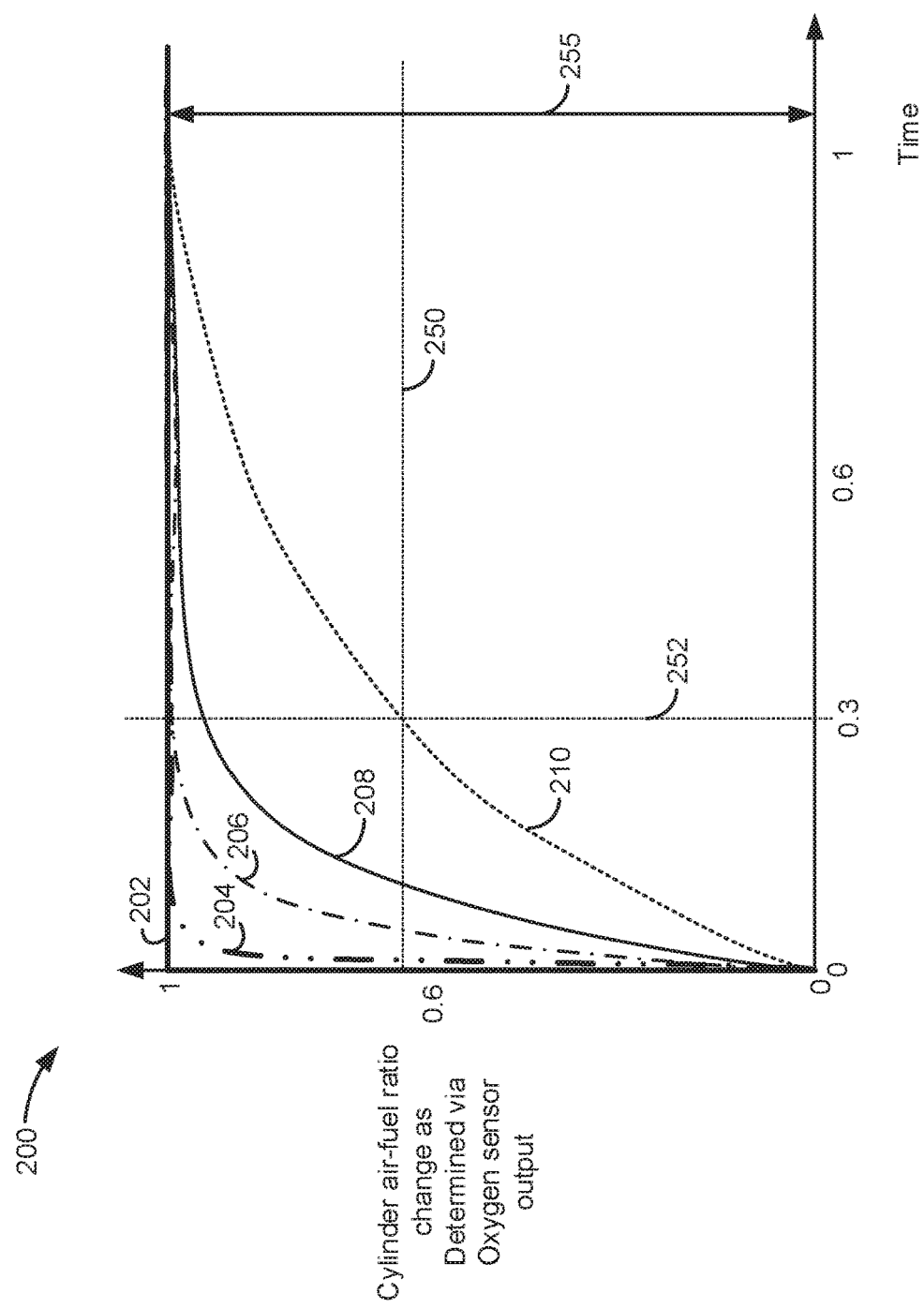
FIG. 2 is a plot of a unit step function and output of several oxygen sensors responsive to the unit step function.
Figure 3:
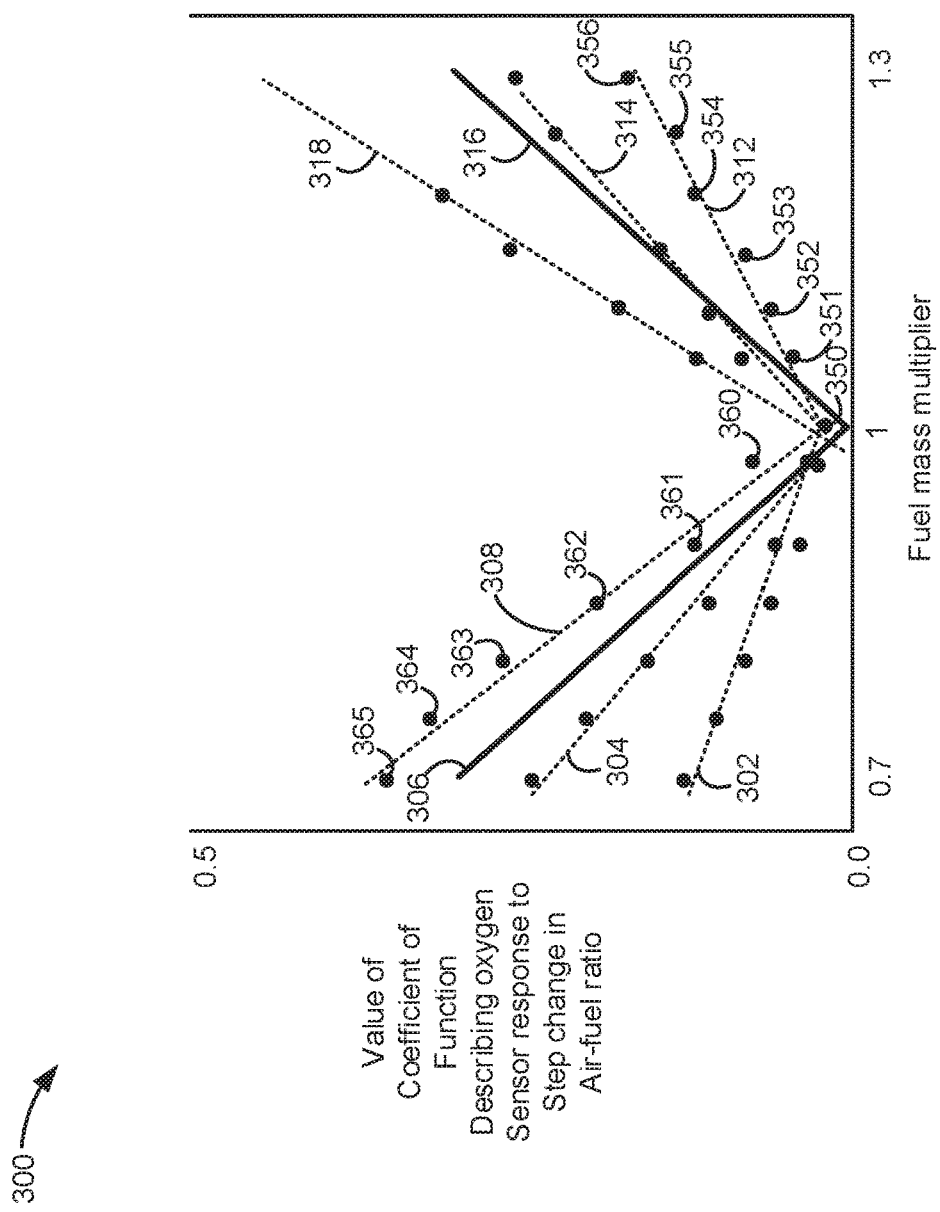
FIG. 3 shows an example plot of a relationship between a fuel mass multiplier and a coefficient of a function describing output of an oxygen sensor to a step change in fuel mass.
Figure 4:
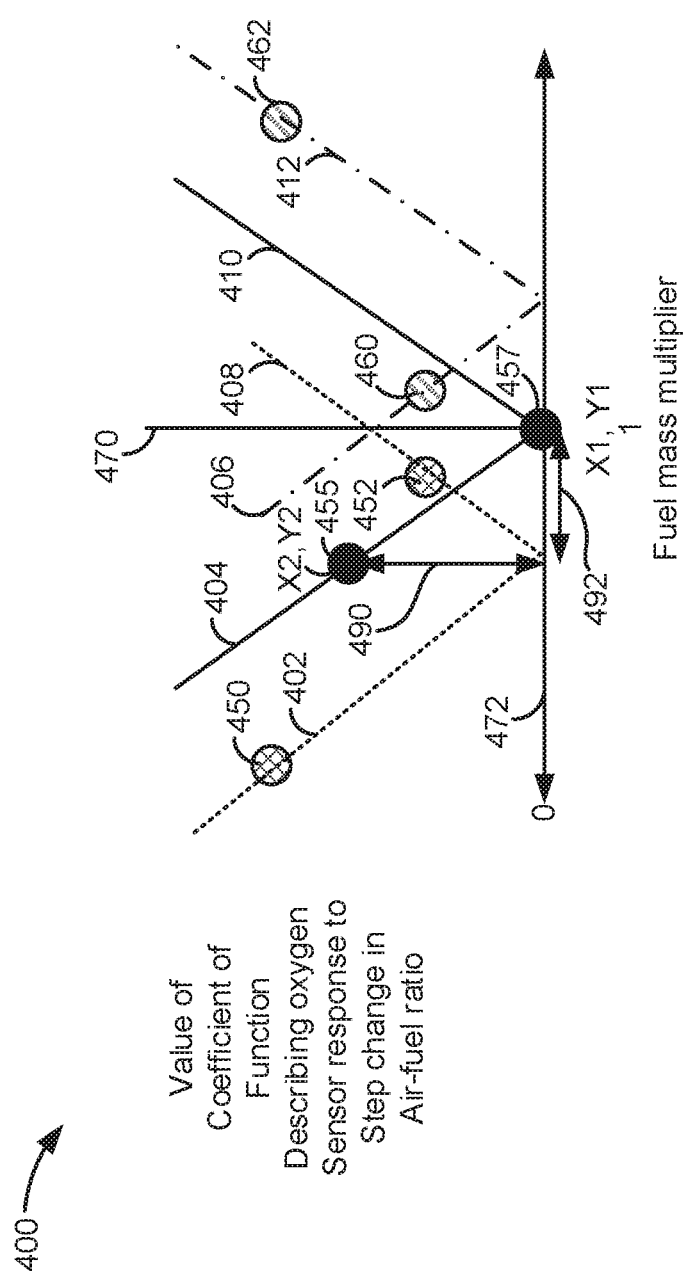
FIG. 4 shows a graphic example of how the relationship shown in FIG. 3 may be the basis for determining air-fuel ratio imbalance.
Figure 5:
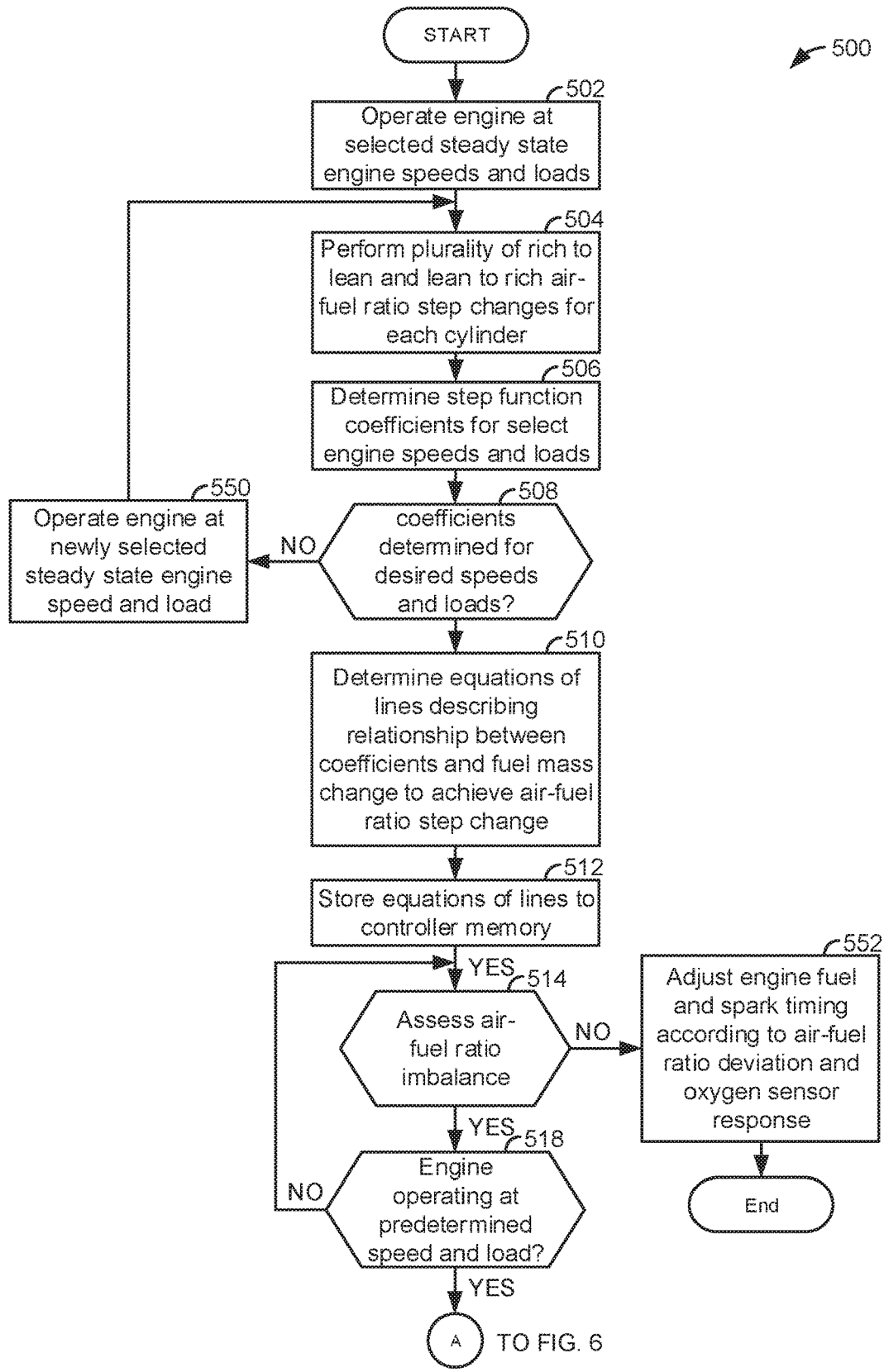
FIGS. 5 and 6 show a flow chart of an example method for determining a lambda or air-fuel ratio imbalance and compensating for the same.
Figure 6:
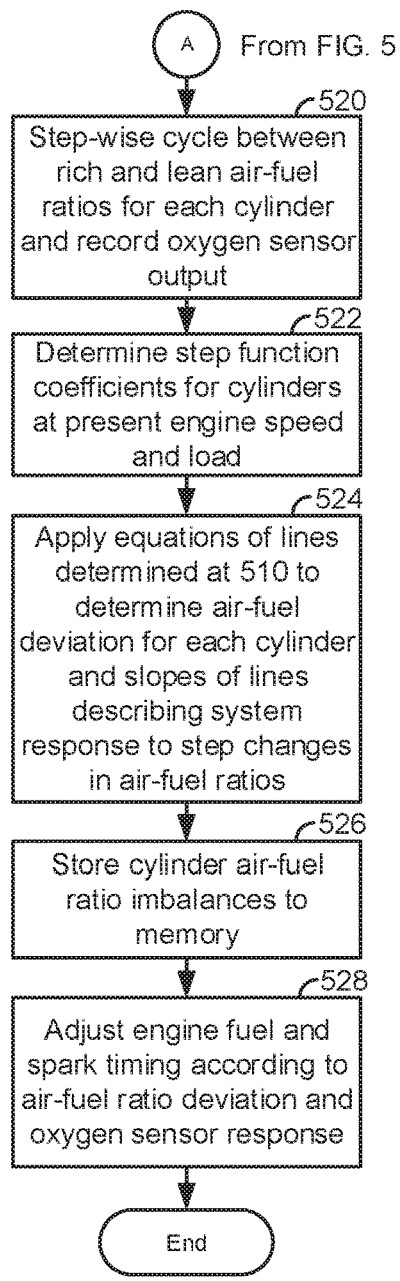

The present description is related to operating an internal combustion engine of a vehicle. The engine may be of the type shown in FIG. 1. The engine may operate with a lambda or air-fuel ratio imbalance between one or more cylinders that may lead to increased engine emissions. The imbalance may be detected via inputting step changes in air-fuel ratio to the engine cylinders as shown in FIG. 2. Oxygen sensor output responsive to the step input in air-fuel ratio or lambda may be applied to generate straight lines showing a relationship between a coefficient of a function and an air-fuel ratio multiplier as shown in FIG. 3. One or more lines may be the basis for determining cylinder air fuel imbalance as depicted in FIG. 4. A method for determining air-fuel ratio imbalance in engine cylinders and compensating for the same is shown in the method of FIGS. 5 and 6.

Figure 1:
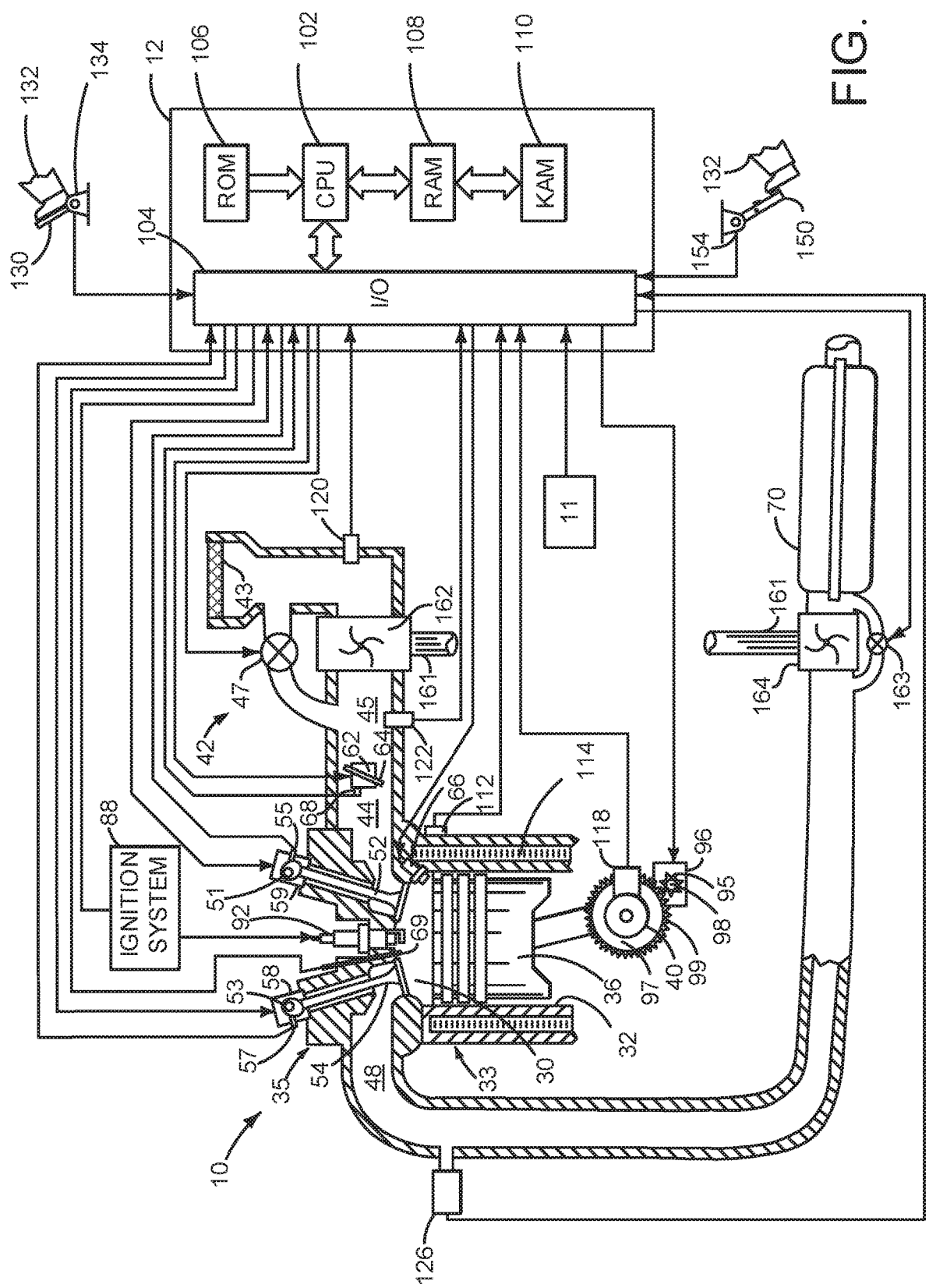
FIG. 1 is a schematic diagram of an engine.

Referring to FIG. 1, internal combustion engine 10, comprising one or more cylinders, one cylinder of which is shown in FIG. 1, is controlled by electronic engine controller 12. The controller 12 receives signals from the various sensors shown in FIGS. 1 and 2. Controller 12 employs the actuators shown in FIG. 1 to adjust engine operation based on the received signals and instructions stored in memory of controller 12.

Engine 10 is comprised of cylinder head 35 and block 33, which include combustion chamber 30 and cylinder walls 32 forming a cylinder. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices. Pressure in combustion chamber 30 may be sensed via cylinder pressure sensor 69.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a system, comprising: an engine including an oxygen sensor and a plurality of cylinders; and a controller including executable instructions stored in non-transitory memory to determine equation of a line describing a relationship between a fuel mass multiplier and a first coefficient of a function describing output of an oxygen sensor to a step change in fuel mass. The system includes where the equation of the line is determined from a slope of a line stored in controller memory and a second coefficient of the function describing output of the oxygen sensor to the step change in fuel mass delivered to an engine cylinder. The system further comprises adjusting an amount of fuel supplied to a cylinder according to a cylinder lambda deviation that is based on the equation of the line. The system includes where the relationship is described via a two dimensional plot, and where one axis of the two dimensional plot represents values of the fuel mass multiplier. The system includes where the air-fuel deviation is determined from a value at a point where the line intersects with the one axis. The system further comprises additional instructions to adjust spark timing of the engine responsive to a location along the line where the engine and oxygen sensor are operating.

FIG. 2 a prophetic plot of a unit step function for a change in an engine cylinder's air fuel ratio (e.g., air-fuel ratio=lambda*stoichiometric air-fuel ratio) and engine cylinder air-fuel ratio change estimates based on output of an oxygen sensor responsive to the unit step change in engine air-fuel ratio are shown. The vertical axis represents a change in engine cylinder air-fuel ratio. The engine cylinder may be operating with a rich, lean, or stoichiometric air-fuel ratio when the step change in cylinder air-fuel ratio is performed. The change in cylinder air-fuel ratio increases from a value of 0 to a value of 1. The horizontal axis represents time and time increases from the left side of the figure to the right side of the figure. In this example, time delays from when the fuel is injected to the cylinder to when the oxygen sensor first senses a change in engine air-fuel ratio are removed for illustration purposes.

Solid line 202 represents a unit step change in engine cylinder air-fuel ratio. The unit step change starts at time zero and it reaches an air-fuel ratio value of one nearly instantaneously. Curve 204 represents engine cylinder air-fuel ratio change value that is responsive to the unit step change in the engine cylinder's air-fuel ratio. The engine cylinder air-fuel ratio change is determined from an output of an oxygen sensor located in an exhaust system downstream of the cylinder receiving the increase in fuel amount. The oxygen sensor with output that is the basis for determining the air-fuel ratio change of curve 204 has a time constant of about 0.01 seconds. The time constant may be estimated by determining the amount of time that it takes for the output of the oxygen to reach 63.2% of its final value after the step change in cylinder air-fuel ratio begins.

Curve 206 also represents engine cylinder air-fuel ratio change value that is responsive to the unit step change in the engine cylinder's air-fuel ratio. The engine cylinder air-fuel ratio change is determined from an output of an oxygen sensor located in an exhaust system downstream of the cylinder receiving the increase in fuel amount. The oxygen sensor with output that is the basis for determining the air-fuel ratio change of curve 206 has a time constant of about 0.05 seconds.

Curve 208 also represents engine cylinder air-fuel ratio change value that is responsive to the unit step change in the engine cylinder's air-fuel ratio. The engine cylinder air-fuel ratio change is determined from an output of an oxygen sensor located in an exhaust system downstream of the cylinder receiving the increase in fuel amount. The oxygen sensor with output that is the basis for determining the air-fuel ratio change of curve 208 has a time constant of about 0.1 seconds.

Curve 210 also represents engine cylinder air-fuel ratio change value that is responsive to the unit step change in the engine cylinder's air-fuel ratio. The engine cylinder air-fuel ratio change is determined from an output of an oxygen sensor located in an exhaust system downstream of the cylinder receiving the increase in fuel amount. The oxygen sensor with output that is the basis for determining the air-fuel ratio change of curve 210 has a time constant of about 0.3 seconds. Line 250 represents a level where 63.2% of the final unit step value of 1 is reached. Curve 210 intersects line 250 at a time where line 252 intersects line 250 and curve 210, or about 0.3 seconds. Thus, the time constant for curve 210 is a time from time zero (e.g., the vertical axis) to a time where the curve being analyzed (curve 210) reaches 63.2% of its final value.

It should be noted that in this example, output of each of the oxygen sensors reaches a same final value as the unit step change in engine air-fuel ratio. However, output of the oxygen sensors may be lower or higher than the final value of the unit step input due to mischaracterized fuel injector flow, fuel injection timing errors, and other noise sources. For example, for a commanded unit step increase of 1 air-fuel ratio, the oxygen sensor may indicate an air-fuel ratio increase of 0.76 or 1.03. Arrow 255 represents a magnitude of a final value of the oxygen sensor based engine air-fuel measurement. Arrow 255 graphically represents a value of a coefficient of a function describing output of an oxygen sensor to a step change in fuel mass.

Referring now to FIG. 3, a plot illustrating lines that describe a relationship between a fuel mass multiplier and a coefficient of a function describing output of an oxygen sensor to a step change in fuel mass is shown. The lines shown in FIG. 3 may be generated via operating an engine on a dynamometer and performing step changes to a desired or requested engine lambda (e.g., via the fuel mass multiplier) that are inducted into engine cylinders.

The vertical axis represents values of coefficients of a function describing oxygen sensor response to a step change of cylinder fuel mass. It should be noted that when the fuel mass multiplier is reduced, the coefficient is expressed as a positive value by taking the absolute value of the oxygen sensor output change so that the coefficient K is always positive even though the lambda value or air-fuel ratio as determined by the oxygen sensor is decreasing. The function may be described by the equation one:

$$UEGO_{response} = K \cdot \left(1 - e^{-\frac{t}{\tau}}\right) \qquad (1)$$

where $UEGO_{response}$ is the output response of the UEGO to a step air-fuel ratio or lambda change to a cylinder's air-fuel ratio or lambda value, K is the coefficient of the function describing output of the oxygen sensor to a step change in fuel mass (cylinder air mass is maintained at a constant value during the step change in air-fuel ratio), e is Euler's number, t is time, and τ is a time constant tau. The value of the vertical axis where the vertical axis crosses the horizontal axis is zero.

The horizontal axis represents a value of a fuel mass multiplier. The fuel mass multiplier value is a value of one when the engine and oxygen sensor are not being operated to detect or determine cylinder air-fuel ratio imbalance. The engine lambda value is the desired engine lambda value (e.g., 1 for stoichiometric operation) based on engine speed, engine load, and engine temperature when the fuel mass multiplier is a value of one. In other words, a fuel mass multiplier value of one does not change a base fuel mass injected to an engine cylinder. A fuel mass multiplier value of 0.9 reduces the base fuel mass injected to an engine cylinder by 10%. Thus, when requested or desired engine lambda is 1, the commanded engine lambda value is 0.9=1*0.9. A fuel mass multiplier of 1.1 increases the base fuel mass injected to an engine cylinder by 10%.

The straight lines 302, 304, 308, 312, 314, and 318 are determined at a constant engine speed. Lines 302 and 312 are determined at a constant engine load of 0.7. Lines 304 and 314 are determined at a constant engine load of 0.9. Lines 308 and 318 are determined at a constant engine load of 1.2. Lines 306 and 316 are idealized lines determined from a 1:1 relationship between the fuel multiplier value and equal response of the oxygen sensor. For example, for a 10% change in the fuel mass multiplier, a 10% change in oxygen sensor indicated lambda is generated.

Each of the lines 302, 304, 308, 312, 314, and 318 may be determined via operating the engine on a dynamometer and performing step changes to the engine air-fuel ratio or lambda value. For example, line 312 may be determined from a least squares regression of data points 350-356. The equation of line 308 may be determined from a least squares regression of data points 360-365. Alternatively, when only two points are known, the equation of the line may be determined by determining the slope of the line and the offset of the line via the following equations:

$$\text{Slope} = \frac{Y2 - Y1}{X2 - X1} \quad (2)$$

$$\text{offset} = Y1 - \text{Slope}(X1) \quad (3)$$

where Slope is the slope of the line, offset is the offset of the line, Y2 is the value along the vertical axis where the second data point is located (e.g., the coefficient of a function describing output of an oxygen sensor to a step change in fuel mass), Y1 is the value along the vertical axis where the first data point is located, X2 is the value along the horizontal axis where the second data point is located (e.g., the air-fuel or lambda value to which the engine air-fuel or lambda value is adjusted), and X1 is the value along the horizontal axis where the first data point is located.

Data points 350 may be determined via operating an engine at a predetermined speed (e.g., 2000 RPM) at a load of 0.7. Each of the data points 350-356 represents data from a new (e.g., fast response) oxygen sensor, and data points 350-356 are generated via providing step changes to the fuel mass multiplier as indicated along the horizontal axis. The vertical component of data points 350-356 are the coefficients of the function (e.g., equation one) describing output of an oxygen sensor to the step changes in fuel mass indicated along the horizontal axis as determined from oxygen sensor output that is responsive to the step changes in the fuel mass multiplier. Lines 302, 304, 308, 314, and 318 may be generated in a similar way. The equations (e.g., slopes and offsets) of the lines may be stored in controller memory as baseline relationships between a fuel mass multiplier and a coefficient of a function describing output of an oxygen sensor to a step change in fuel mass.

Referring now to FIG. 4, a graphic example showing how the relationships shown in FIG. 3 may be applied to determine cylinder air-fuel ratio imbalance is shown. Vertical axis 470 is positioned along the horizontal axis 472 where the value along the horizontal axis is one. The value of the vertical axis where the vertical axis crosses the horizontal axis is zero. Vertical axis 470 represents values of coefficients of a function describing oxygen sensor response to a step change of cylinder fuel mass and the values increase in the direction of the vertical axis arrow. The lines 402, 404, 406, 408, 410, and 412 represent relationships between fuel mass multipliers and coefficients of a function describing output of an oxygen sensor to step changes in fuel mass. Further, lines 404 and 410 represent baseline lines for the relationships between fuel mass multipliers and coefficients of a function describing output of an oxygen sensor to step changes in fuel mass. Lines 402, 408, 406, and 412 are lines that may be determined during engine operation when a vehicle is in service operating on a road. The equations of lines 404 and 410 are empirically determined as discussed in the description of FIG. 3, and their respective slope and offset values may be stored in controller non-transitory memory. The equations of lines 402, 406, 408, and 412 may be determined as described in further detail below.

The horizontal axis 472 represents a value of a fuel mass multiplier. The fuel mass multiplier value is one at the location of vertical axis 470. The value of the fuel mass multiplier is reduced to the left of vertical axis 470, and the value of the fuel mass multiplier is increased to the right of vertical axis 470. Data points 455 and 457 are located along line 404. Data point 455 is located at (X2, Y2) and leader 490 represents a distance from the horizontal axis to data point 455. Leader 492 represents a distance from the vertical axis where data point 455 lies. Data point 457 is located at (X1,Y1). The X1 value is 1 and the Y1 value is zero. X2, X1, Y2, and Y1 shown in FIG. 4 graphically illustrate X2, X1, Y2, and Y1 mentioned in equations 2 and 3.

The equation of lines 402, 406, 408, and 412 may be determined from data points 450, 452, 460, and 462 along with the slopes of lines 404 and 410. For example, the equation of line 402 may be determined via equation three, data point 450, and the slope of line 404, which may be determined via operation the engine on a dynamometer as mentioned in the description of FIG. 3. The slope of line 404 may be representative of the slope of line 402 because the lines are generated under similar engine and oxygen sensor operating conditions (e.g., same engine speed and engine load). Therefore, the slope of line 404, a baseline line, may be applied to determine the equation of line 402. For example, if the slope of line 404 is −0.76, then the offset for line 402 may be determined from the equation: 0.2=−0.76 (0.7)+offset (e.g., Y2=(Slope*X1)+offset), when Y2 is 0.2 and X2 is 0.7. Thus, in this example, the offset value is 0.732. The offset value may then be applied to determine where line 402 intersects with the horizontal axis (e.g., where Y=0). The value along the horizontal axis where line 450 intersects with the horizontal axis is the fuel imbalance for the cylinder. Thus, solving equation 3 for where the Y value is zero yields: (−0.732/−0.76)=X1 or 0.963. The value of 0.963 corresponds to a 3.68% (e.g., 1-0.963) fuel imbalance for the cylinder being evaluated. Thus, when operating condition 450 is determined via operating the engine and oxygen sensor according to the method of FIGS. 5 and 6, then the equation of line 402 may be determined by applying a baseline slope and the operating condition to determine the offset value in the equation of the line that describes line 402. Once the offset value is determined, then the fuel imbalance may be determined via solving the equation of the line for where the Y (e.g., vertical) value is equal to zero. Similarly, the equations of lines 406, 408, and 412 may be determined from operating conditions 452, 460, and 462. For the equations of lines 408 and 412, the slope of line 410 is retrieved from controller memory and applied to determine the equations of these lines. Lines 408, 410, and 412 may be characterized as being formed in response to fuel mass multiplier values that are greater than a value of one.

Lines 402, 404, and 406 may be characterized as being formed in response to fuel mass multiplier values that are less than a value of one.

Referring now to FIGS. 5 and 6, a flow chart of a method for determining cylinder fuel imbalance and compensating for the same is shown. The method of FIGS. 5 and 6 may be incorporated into and may cooperate with the system of FIG. 1. Further, at least portions of the method of FIGS. 5 and 6 may be incorporated as executable instructions stored in non-transitory memory while other portions of the method may be performed via a controller transforming operating states of devices and actuators in the physical world. Steps 502-512 and 550 may be performed with an engine operating on a dynamometer. Steps 514-528 and 552 may be performed with an engine operating in a vehicle driving on a road.

At 502, method operates the engine at predetermined engine speeds and load (e.g., engine speeds between 1000 RPM and 3500 RPM, engine loads between 0.2 and 1.2). In one example, the engine is operated at a lowest engine speed and load, the engine speed and load are incrementally increased until the engine operates at all the desired engine speeds and loads. The engine rotates and combusts fuel at the predetermined speeds and load. Method 500 proceeds to 504.

At 504, method 500 performs a plurality of stoichiometric to lean and lean to stoichiometric air-fuel ratio step changes for each engine cylinder. Further, method 500 may perform stoichiometric to rich and rich to stoichiometric air-fuel ratio step changes for each cylinder. Further, the magnitude of the stoichiometric to lean and lean to stoichiometric air-fuel ratio step changes may be varied. For example, when the engine is operating at 1000 RPM and 0.2 load, the constant desired engine lambda value may be multiplied by a fuel multiplier value that is changed from a value of 1 to a value of 0.75 to initiate the step change in cylinder air-fuel ratio. The fuel multiplier value is changed in a step-wise fashion so that the engine's air-fuel ratio and lambda value may also change in a step-wise fashion. In one example, the fuel multiplier is a value of one and then it is changed to a value of 0.75 from one instant in time to a value of 1 in a next instant of time, with the fuel multiplier taking on no other values between 0.75 and 1. After the engine and oxygen sensor are given time to respond to the change in the fuel multiplier value, the fuel multiplier value is changed from the value of 0.75 to the value of 1. This process may be repeated a predetermined number of times at each engine speed and load while output of the oxygen sensor is being monitored and/or stored to controller random access memory. And as mentioned, the fuel multiplier value may be changed to various predetermined values at each engine speed and load so that the engine air-fuel ratio and lambda value cycles between several desired engine lambda values so that lines similar to the lines shown in FIG. 3 may be generated. Method 500 proceeds to 506.

At 506, method 500 determines coefficients for each cylinder that allow output of equation 1 to follow the output response of the oxygen sensor as determined from performing the step changes in air-fuel ratio and engine lambda described at 504. The coefficient K may be determined via monitoring output of the oxygen sensor after performing a step-wise change in the fuel multiplier of a cylinder to change the air-fuel ratio and lambda value of the cylinder. In particular, the cylinder's air-fuel ratio or lambda value as determined via output of the oxygen sensor at a time immediately before the step-wise change in the fuel multiplier may be monitored and stored to controller memory.

Further, the cylinder's air-fuel ratio or lambda value as determined via output of the oxygen sensor may be determined for a predetermined amount of time (e.g., 3-4 time constants) after the step-wise change in fuel multiplier has been changed to change the engine's air-fuel ratio or lambda value. The value of K is determined from the change in cylinder air-fuel ratio or a change in cylinder lambda according to values of the cylinder air-fuel ratio or the cylinder lambda before the change to the fuel multiplier, which changes the cylinder air-fuel ratio, and the cylinder air-fuel ratio values or cylinder lambda value that are observed via the oxygen sensor after the predetermined amount of time. For example, if the fuel multiplier is changed to generate a step-wise change of one air-fuel ratio and output of the oxygen sensor indicates a lambda change of 0.2 in response to the step-wise change command of 0.2 lambda, then the value of K is adjusted to 0.2 for the cylinder being monitored for the air-fuel imbalance determination. Arrow 255 in FIG. 2 indicates an example of the magnitude of coefficient K. In this example, the final magnitude response output of the oxygen sensor (e.g., represented by the length of arrow 255) is equivalent to the magnitude of the engine air-fuel ratio change. Several values of K may be determined for a particular engine speed, engine load, and fuel multiplier adjustment responsive to the plurality of step-wise changes to the cylinder's air-fuel ratio. The several values of K may be averaged to determine a value of K that may be the basis for determining an equation of a line as described in FIG. 4. The value of K represents a coefficient of a function describing output of an oxygen sensor to a step change in fuel mass (e.g., the Y or vertical value of operating point 450 shown in FIG. 4). Method 500 proceeds to 508.

At 508, method 500 judges whether or not coefficients for all engine cylinders at desired engine speeds and loads have been determined. If so, the answer is yes and method 500 continues to 510. Otherwise, the answer is no and method 500 proceeds to 550.

At 550, method 500 adjusts the engine to a new engine speed and/or load for which rich and lean air-fuel ratio step-wise changes have not been performed. Engine speed and load may be adjusted via adjusting the engine's throttle opening amount. For example, method 500 may increase the engine load by 0.2 before applying further step changes to the cylinder's lambda value. Method 500 returns to 504.

At 510, method 500 determines equations of straight lines for the cylinders having step-wise changes commanded to their air-fuel ratios or lambda values. In one example, method 400 retrieves values of the coefficients that allow output of equation 1 to follow the output response of the oxygen sensor as determined from performing the step changes in air-fuel ratio and/or cylinder lambda described at 504 (e.g., coefficients of a function describing outputs of an oxygen sensor to step changes in fuel mass). Method 500 also retrieves the fuel mass change from which the value of the coefficient that allows output of equation 1 to follow the output of the oxygen sensor after the change in the cylinder's air-fuel ratio or lambda is determined. For each coefficient that allows the output of equation 1 to follow the output response of the oxygen sensor, there is a corresponding air-fuel ratio or cylinder lambda value which the cylinder was changed to in order to generate its related coefficient that allows the output of equation 1 to follow output of the oxygen sensor. An equation of a line representing a best fit for data at a particular engine speed and load may be determined via a least squares fit and the following equations:

$$\text{Slope} = \frac{N\sum x \cdot y - \sum x \sum y}{(N\sum x^2) - (\sum x)^2} \quad (4)$$

$$\text{Offset} = \frac{\sum y - \text{Slope}(\sum x)}{N} \quad (5)$$

where Slope is the slope of the line N is the number of data points (x,y), x is the value the engine lambda is changed to from a value of 1 (e.g., 0.75), y is the value of the coefficient that allows output of equation 1 to follow the output response of the oxygen sensor as determined from performing the step changes in air-fuel ratio and/or cylinder lambda described at 504, and Offset is the offset value of the line. Alternatively, the equation of the line may be determined via only two of the data points and equations 2 and 3. Method 500 may determine equations of lines for each engine speed and load pair for which the cylinder air-fuel ratio or lambda value was changed in a step-wise manner. FIG. 3 illustrates lines 302, 304, 308, 312, 314, and 318 which are least squares fit of the data points illustrated. Method 500 proceeds to 512.

At 512, method 500 stores the equations of the straight lines determined at 510 into controller memory. The equations are stored in the form of slope and offset values. Method 500 proceeds to 514.

At 514, method 500 judges if there is a request to assess cylinder air-fuel ratio imbalance. The request may be generated after the engine travels a predetermined distance or if the engine has been operating for a predetermined amount of time. If a request to assess cylinder air-fuel ratio imbalance is made, the answer is yes and method 500 proceeds to 518. Otherwise, the answer is no and method 500 proceeds to 552.

At 552, method 500 adjusts cylinder fuel amounts and spark timings according to previously determined cylinder air-fuel ratio imbalances (e.g., cylinder air-fuel ratio imbalances that have been determined at 524). For example, if it is determined that a particular engine cylinder exhibits an air-fuel ratio that is 0.25 air-fuel ratios leaner than commanded, the air-fuel ratio of the cylinder may be commanded 0.25 air-fuel ratios richer so that it may operate at a requested or desired air-fuel ratio. Further, the spark timing of the cylinder may be retarded so that a temperature of the oxygen sensor may be increased to clean the oxygen sensor in an effort to eliminate the cylinder air-fuel deviation, which may be at least partially due to oxygen sensor deposits. The engine fuel amount and spark timings are also adjusted responsive to engine speed, engine load, engine temperature, and ambient engine operating conditions. Method 500 proceeds to exit.

At 518, method 500 judges if the engine is operating at a predetermined engine speed and load. In one example, determination and adjustments for cylinder air-fuel imbalance may be determined only at prescribed engine speeds and loads. If method 500 judges that the engine is operating at a prescribed engine speed and load where it is desired to determine engine air-fuel ratio imbalance, then the answer is yes and method 500 proceeds to 520. Otherwise, the answer is no and method 500 returns to 514. In this way, method 500 may wait to determine and compensate for air-fuel ratio imbalance between engine cylinders until the engine is operating at select conditions. The vehicle and engine may be operating on road when it is determined whether or not the engine is operating at a prescribed engine speed and load.

At 520, method 500 performs a plurality of stoichiometric to lean and lean to stoichiometric air-fuel ratio or lambda step changes for each engine cylinder. Further, method 500 may perform stoichiometric to rich and rich to stoichiometric air-fuel ratio or lambda step changes for each cylinder. In other words, method 500 cycles between stoichiometric, rich, and lean air-fuel ratios for each engine cylinder to determine air-fuel imbalance within the cylinders. Further, the magnitude of the stoichiometric to lean and lean to stoichiometric air-fuel ratio or lambda step changes may be varied. For example, when the engine is operating at 1500 RPM and 0.4 load, the desired engine lambda value may be multiplied by a fuel multiplier value that is changed from a value of 1 to a value of 0.85. The fuel multiplier value is changed in a step-wise fashion so that the engine's air-fuel ratio and/or lambda value may also change in a step-wise fashion. In one example, the fuel multiplier is a value of one and then it is changed to a value of 0.85 from one instant in time to a value of 1 in a next instant of time, with the fuel multiplier taking on no other values between 0.85 and 1. After the engine and oxygen sensor are given time to respond to the change in the fuel multiplier value, the fuel multiplier value is changed from the value of 0.85 to the value of 1. This process may be repeated a predetermined number of times at each engine speed and load while output of the oxygen sensor is being monitored and/or stored to controller random access memory. Additionally, the fuel multiplier value may be changed to various predetermined values at each engine speed and load so that the engine air-fuel ratio and lambda value cycles between several desired engine lambda values. Method 500 proceeds to 522.

At 522, method 500 determines coefficients for each cylinder that allow output of equation 1 to follow the output response of the oxygen sensor as determined from performing the step changes in air-fuel ratio and engine lambda described at 520. The coefficient K for each cylinder may be determined via monitoring output of the oxygen sensor after performing a step-wise change in the fuel multiplier of the cylinders to change the air-fuel ratio and lambda value of the cylinders. In particular, for each cylinder, the cylinder's air-fuel ratio or lambda value as determined via output of the oxygen sensor at a time immediately before the step-wise change in the fuel multiplier may be monitored and stored to controller memory. Further, the cylinder's air-fuel ratio or lambda value as determined via output of the oxygen sensor may be determined for a predetermined amount of time (e.g., 3-4 time constants) after the step-wise change in fuel multiplier has been changed to change the engine's air-fuel ratio or lambda value. The value of K is determined from the change in cylinder air-fuel ratio or a change in cylinder lambda according to values of the cylinder air-fuel ratio or the cylinder lambda before the change to the fuel multiplier, which changes the cylinder air-fuel ratio, and the cylinder air-fuel ratio values or cylinder lambda value that are observed via the oxygen sensor after the predetermined amount of time. For example, if the fuel multiplier is changed to generate a step-wise change of one air-fuel ratio or lambda and output of the oxygen sensor indicates a lambda change of 0.2 in response to the step-wise change command of lambda of 0.2, then the value of K is adjusted to 0.2 for the cylinder being monitored for the air-fuel imbalance determination. Several values of K may be determined for each cylinder at a particular engine speed, engine load, and fuel multiplier adjustment responsive to the plurality of step-wise changes to the cylinder's air-fuel ratio. Method 500 proceeds to 524.

At 524, method 500 applies the equations of straight lines that were determined at 510 to determine the air-fuel ratio deviations for each engine cylinder. Method 500 also determines slopes of lines that describe system response to the step changes in cylinder air-fuel ratios or lambda that were introduced at 520. For example, an equation of a straight line that describes a relationship between a fuel mass multiplier and a coefficient of a function describing output of an oxygen sensor to a step change in fuel mass for a particular engine speed and load may be retrieved from memory and a data point (e.g., x (fuel multiplier value), y (coefficient of a function describing output of an oxygen sensor to a step change in fuel mass)) may be the basis for determining an air-fuel ratio offset for a cylinder. In particular, the slope of the line determined at 510 and the data point may be the basis for determining where a line based on the data point and the slope intercepts with the x (e.g., fuel multiplier variable) axis to determine the air-fuel ratio imbalance for the cylinder being evaluated for air-fuel ratio imbalance.

For example, if the slope of line determined at 510 for the engine's present speed and load is −0.56, and the data point comprised of a fuel multiplier value (e.g., 0.8) and a coefficient of a function describing output of an oxygen sensor to a step change in fuel mass (e.g., 0.3) may be determined from the equation: 0.3=−0.56(0.8)+offset (e.g., Y1=(Slope*X1)+offset), when Y1 is 0.3 and X1 is 0.8. Thus, in this example, the offset value is 0.748. The offset value may then be applied to determine where line that is based on the point determined from the coefficient and the fuel multiplier intersects with the horizontal axis (e.g., where Y=0). The value along the horizontal axis where line intersects with the horizontal axis is the fuel imbalance for the cylinder. An example of this procedure is discussed with regard to FIG. 3. The fuel imbalance for the cylinder may be determined via solving equation 3 for where the Y value is zero yields: (0.748−0.3)/0.56=X1 or 0.8. The value of 0.8 corresponds to a 20% (e.g., 1-0.8) fuel imbalance for the cylinder being evaluated. Thus, when the operating condition (x (e.g., fuel multiplier),y (e.g., coefficient of function)) is determined via operating the engine and oxygen sensor according at 520, then the slope of line determined at 510 for similar operating conditions may be applied to determine the offset value in the equation of the line that describes present operating conditions. Once the offset value is determined, then the fuel imbalance may be determined via solving the equation of the line for where the Y (e.g., vertical) value is equal to zero. Similarly, the cylinder imbalance for other engine cylinders may be determined. Method 500 proceeds to 526.

At 526, method 500 stores cylinder air-fuel imbalance values for each cylinder to controller memory. Method 500 proceeds to 528.

At 528, method 500 method 500 adjusts cylinder fuel amounts and spark timings of each cylinder according to previously determined cylinder air-fuel ratio imbalances (e.g., cylinder air-fuel ratio imbalances that have been determined at 524). For example, if it is determined that a particular engine cylinder exhibits an air-fuel ratio that is 0.25 air-fuel ratios leaner than commanded, the air-fuel ratio of the cylinder may be commanded 0.25 air-fuel ratios richer so that it may operate at a requested or desired air-fuel ratio. Further, the spark timing of the cylinder may be retarded so that a temperature of the oxygen sensor may be increased to clean the oxygen sensor in an effort to eliminate the cylinder air-fuel deviation, which may be at least partially due to oxygen sensor deposits. The engine fuel amount and spark timings are also adjusted responsive to engine speed, engine load, engine temperature, and ambient engine operating conditions. Method 500 proceeds to exit.

The method of FIGS. 5 and 6 provides for an engine operating method, comprising: adjusting an amount of fuel supplied to a cylinder via a controller according to a cylinder lambda deviation generated via a line describing a relationship between a fuel mass multiplier and a coefficient of a function describing output of an oxygen sensor to a step change in fuel mass. The method includes where the function includes a time constant. The method further comprises determining an equation of the line from a point that lies on the line. The method includes where a slope of the line is a predetermined value stored in controller memory. The method includes where the relationship is described via a two dimensional plot, and where one axis of the two dimensional plot represents values of the fuel mass multiplier. The method includes where the cylinder lambda deviation is determined from a value at a point where the line intersects with the one axis. The method further comprises determining the coefficient via adjusting a mass of fuel supplied to the cylinder.

The method of FIGS. 5 and 6 also provides for an engine operating method, comprising: adjusting an amount of fuel supplied to a cylinder via a controller according to a slope of a line describing a relationship between a fuel mass multiplier and a coefficient of a function describing output of an oxygen sensor to a step change in fuel mass. The method further comprises adjusting spark timing of the cylinder according to the line describing the relationship between the fuel mass multiplier and the coefficient of friction describing output of the oxygen sensor to the step change in fuel mass. The method further comprises determining an equation of the line from a point that lies on the line. The method includes where the slope of the line is a predetermined value stored in controller memory. The method further comprises determining the relationship via adjusting a value of the fuel mass multiplier. The method includes where the function describes a first order response of the oxygen sensor to the step change in fuel mass. The method further comprises determining a point on the line via operating an engine within a predetermined speed and load range.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
    determining a line describing a relationship between a fuel mass multiplier and a coefficient of a function describing output of an oxygen sensor in response to a step change in fuel mass and adjusting a value of the fuel mass multiplier; and
    adjusting an amount of fuel supplied to a cylinder via a controller according to a fuel imbalance value based on the determined line.

2. The method of claim 1, where the function includes a time constant of the oxygen sensor.

3. The method of claim 1, further comprising determining an equation of the line from a point that lies on the line.

4. The method of claim 3, where a slope of the line is a predetermined value stored in controller memory.

5. The method of claim 3, where the relationship is described via a two dimensional plot, and where one axis of the two dimensional plot represents values of the fuel mass multiplier.

6. The method of claim 5, where the fuel imbalance value is determined from a value at a point where the line intersects with the one axis.

7. The method of claim 1, further comprising determining the coefficient via adjusting a mass of fuel supplied to the cylinder.

8. An engine operating method, comprising:
    determining a line describing a relationship between a fuel mass multiplier and a coefficient of a function describing output of an oxygen sensor in response to a step change in fuel mass and adjusting a value of the fuel mass multiplier; and
    adjusting an amount of fuel supplied to a cylinder via a controller according to a slope of the determined line.

9. The method of claim 8, further comprising adjusting spark timing of the cylinder according to the line describing the relationship between the fuel mass multiplier and the coefficient of a function describing output of the oxygen sensor to the step change in fuel mass.

10. The method of claim 8, further comprising determining an equation of the line from a point that lies on the line.

11. The method of claim 10, where the slope of the line is a predetermined value stored in controller memory.

12. The method of claim 8, where the function describes a first order response of the oxygen sensor to the step change in fuel mass.

13. The method of claim 8, further comprising determining a point on the line via operating an engine within a predetermined speed and load range.

14. A system, comprising:
    an engine including an oxygen sensor and a plurality of cylinders; and
    a controller including executable instructions stored in non-transitory memory to determine an equation of a line describing a relationship between a fuel mass multiplier and a first coefficient of a function describing output of an oxygen sensor in response to a step change in fuel mass and adjusting a value of the fuel mass multiplier.

15. The system of claim 14, where the equation of the line is determined from a slope of a line stored in controller memory and a second coefficient of the function describing output of the oxygen sensor to the step change in fuel mass delivered to an engine cylinder.

16. The system of claim 14, further comprising adjusting an amount of fuel supplied to a cylinder according to a fuel imbalance value that is based on the equation of the line.

17. The system of claim 16, where the relationship is described via a two dimensional plot, and where one axis of the two dimensional plot represents values of the fuel mass multiplier.

18. The system of claim 14, where a fuel imbalance value is determined from a value at a point where the line intersects with the one axis.

19. The system of claim 14, further comprising additional instructions to adjust spark timing of the engine responsive to a location along the line where the engine and oxygen sensor are operating.

* * * * *